(12) United States Patent
Lehmann et al.

(10) Patent No.: US 11,967,726 B2
(45) Date of Patent: Apr. 23, 2024

(54) DISTANCE COMPENSATING ELEMENT, USE OF A METAL FOIL AS DISTANCE COMPENSATING ELEMENT AND ARRANGEMENT WITH DISTANCE COMPENSATING ELEMENT

(71) Applicants: Wickeder Westfalenstahl GmbH, Wickede (DE); Micrometal GmbH, Muellheim (DE)

(72) Inventors: Bernd Lehmann, Kandern (DE); Carina Franken, Arnsberg-Oeventrop (DE); Angel Lopez, Pforzheim (DE)

(73) Assignees: Wickeder Westfalenstahl GmbH, Wickede (DE); Micrometal GmbH, Muelheim (DE)

( * ) Notice: Subject to any disclaimer, the term of this patent is extended or adjusted under 35 U.S.C. 154(b) by 654 days.

(21) Appl. No.: 17/258,199

(22) PCT Filed: Jul. 10, 2019

(86) PCT No.: PCT/EP2019/068498
§ 371 (c)(1),
(2) Date: Jan. 6, 2021

(87) PCT Pub. No.: WO2020/011833
PCT Pub. Date: Jan. 16, 2020

(65) Prior Publication Data
US 2021/0288369 A1    Sep. 16, 2021

(30) Foreign Application Priority Data
Jul. 10, 2018    (DE) .................... 10 2018 116 683.4

(51) Int. Cl.
*H01M 50/224*    (2021.01)
*H01M 50/204*    (2021.01)
(Continued)

(52) U.S. Cl.
CPC ....... *H01M 50/224* (2021.01); *H01M 50/204* (2021.01); *H01M 50/213* (2021.01);
(Continued)

(58) Field of Classification Search
CPC ...... H02J 50/224; H02J 50/249; H02J 50/528; H02J 50/251; H02J 50/242; H02J 50/238; H02J 50/213; H02J 50/204
(Continued)

(56) References Cited

U.S. PATENT DOCUMENTS

| 5,645,955 A | 7/1997 | Maglica |
| 5,871,857 A | 2/1999 | Alhamad |

(Continued)

FOREIGN PATENT DOCUMENTS

| CN | 101031778 A | 9/2007 |
| CN | 102640320 A | 8/2012 |

(Continued)

*Primary Examiner* — Nathaniel R Pelton
(74) *Attorney, Agent, or Firm* — The Webb Law Firm

(57) ABSTRACT

The invention relates to a distance compensating element for arrangement between two components with a metal foil (4), with spring elements (6) integrally formed with the metal foil (4), wherein the spring elements (6) project from the plane (E) of the metal foil (4) and wherein the spring elements (6) are adapted to be in contact with at least one of the components. The invention also relates to an arrangement comprising two components (22, 24) and a distance-compensating element (2). The invention solves the technical problem of improving a spacer element and an arrangement of two components and a spacer element.

13 Claims, 11 Drawing Sheets

(51) Int. Cl.
*H01M 50/213* (2021.01)
*H01M 50/238* (2021.01)
*H01M 50/242* (2021.01)
*H01M 50/249* (2021.01)
*H01M 50/251* (2021.01)
*H01M 50/528* (2021.01)

(52) U.S. Cl.
CPC ....... *H01M 50/238* (2021.01); *H01M 50/242* (2021.01); *H01M 50/249* (2021.01); *H01M 50/251* (2021.01); *H01M 50/528* (2021.01)

(58) Field of Classification Search
USPC .......................................................... 320/112
See application file for complete search history.

(56) References Cited

U.S. PATENT DOCUMENTS

| | | | |
|---|---|---|---|
| 6,054,088 A | 4/2000 | Alhamad | |
| 2,074,764 A | 6/2000 | Takayasu | |
| 6,074,764 A | 6/2000 | Takayasu | |
| 6,207,293 B1 | 3/2001 | Ragland et al. | |
| 6,372,280 B1 | 4/2002 | Gonsalves et al. | |
| 9,985,266 B1 | 5/2018 | Potter et al. | |
| 2001/0007728 A1* | 7/2001 | Ogata | H01M 50/291 429/153 |
| 2009/0235506 A1 | 9/2009 | Castricum | |
| 2012/0219839 A1 | 8/2012 | Kritzer et al. | |
| 2016/0164061 A1* | 6/2016 | Han | H01M 50/209 429/120 |
| 2016/0260946 A1* | 9/2016 | Ochi | H01M 10/6563 |
| 2016/0281359 A1 | 9/2016 | Tipping | |

FOREIGN PATENT DOCUMENTS

| | | |
|---|---|---|
| CN | 107078311 A | 8/2017 |
| DE | 102007017340 A1 | 10/2008 |
| DE | 102010001033 A1 | 7/2011 |
| EP | 0842766 A1 | 5/1998 |
| EP | 2355204 A1 | 8/2011 |
| JP | 2000311714 A | 11/2000 |
| JP | 2005119068 A | 5/2005 |
| JP | 2010533954 A | 10/2010 |
| JP | 2014060012 A | 4/2014 |
| KR | 101793084 B1 | 11/2017 |

* cited by examiner

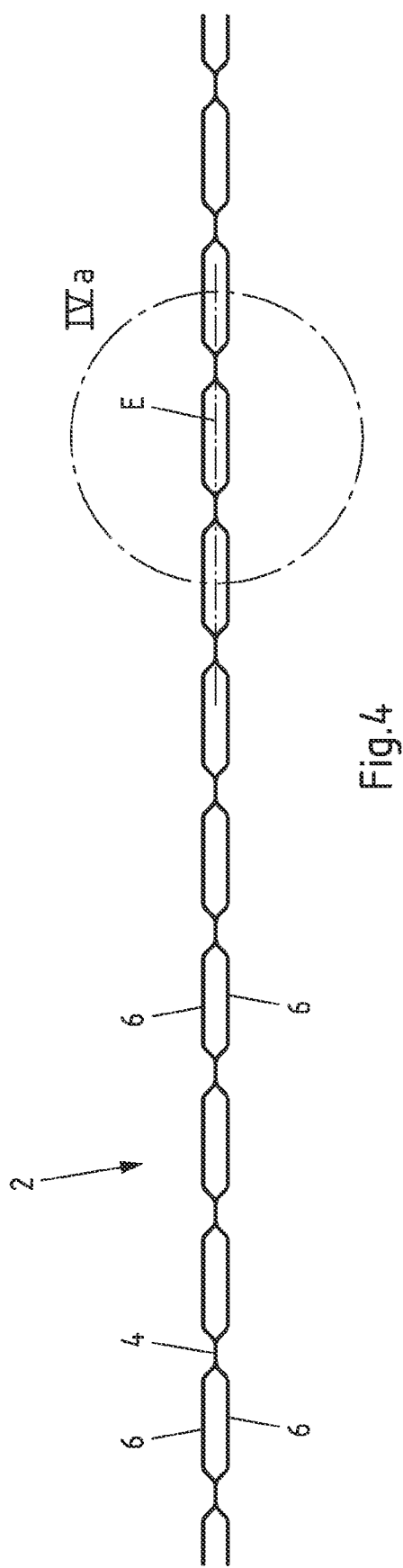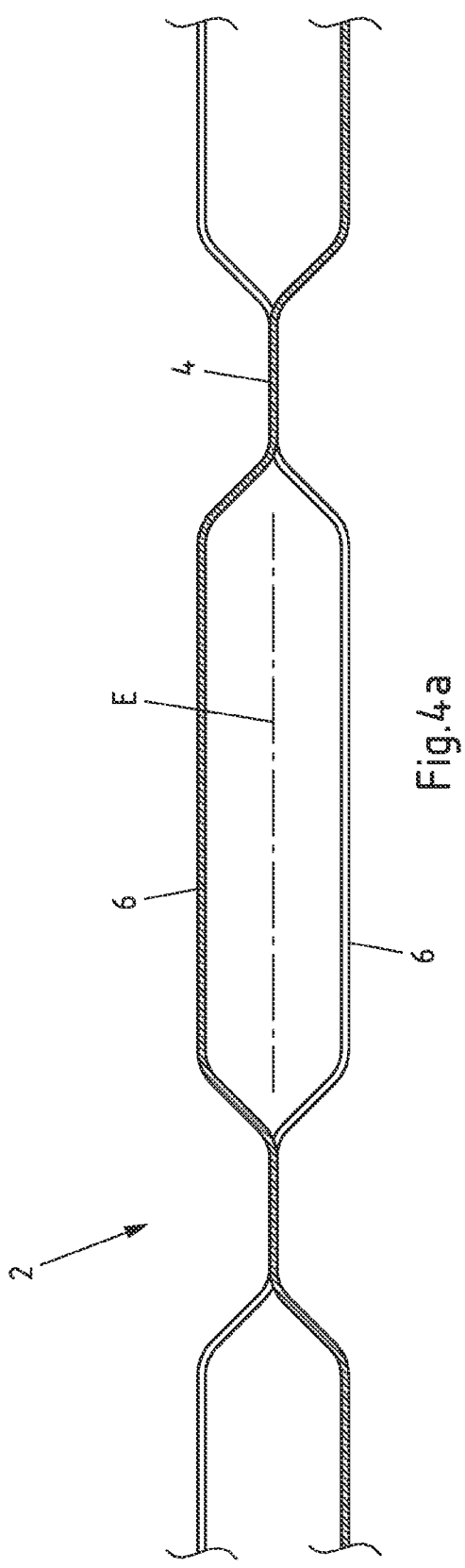

DISTANCE COMPENSATING ELEMENT, USE OF A METAL FOIL AS DISTANCE COMPENSATING ELEMENT AND ARRANGEMENT WITH DISTANCE COMPENSATING ELEMENT

CROSS-REFERENCE TO RELATED APPLICATIONS

This application is the United States national phase of International Application No. PCT/EP2019/068498 filed Jul. 10, 2019 and claims priority to German Patent Application No. 10 2018 116 683.4 filed Jul. 10, 2018, the disclosures of which are hereby incorporated by reference in their entirety.

BACKGROUND OF THE INVENTION

Field of the Invention

The invention relates to a distance compensating element, a use of a metal foil as a distance compensating element and an arrangement of two components with a distance compensating element arranged therebetween.

Description of Related Art

Component groups in which individual components with varying dimensions are installed require a distance compensation element, also known as a gap filler, for a secure arrangement. The distance compensation element is arranged in a housing when the component group is assembled and is suitable for holding other components with different dimensions caused by production or thermal expansion by means of elastic deformability. Due to the elasticity of the distance compensation element, the component is securely clamped in the housing so that during use of the component group, the component is held securely and firmly in its predetermined position.

An example of such a component group is a battery arrangement in a battery tray that is closed with a lid. The lengths and/or widths of the individual battery units or battery cells, such as round cells, pouch cells or solid-state cells, differ from each other in the millimetre range due to production. Nevertheless, the battery units must be positioned in the battery tray in such a way that the differences in dimensions are compensated and the sealing of the battery tray is reliably possible. In addition, when the battery tray is closed, movement of the battery units within the tray must be reliably prevented, or at least restricted, despite vibrations occurring during use, for example in a vehicle.

The term "battery" is primarily used for a rechargeable battery, i.e. an accumulator, but also for a non-rechargeable battery.

For this application, the arrangement of ceramic plates from DE 10 2010 001 033 A1 or acrylic pads (from the company 3M) is known. However, since the materials mentioned have poor thermal conductivity, additional measures such as arranging heat conducting foils must be taken.

Distance compensation elements are also required for other electrical or electronic component groups. In smart devices (smart phones, tablets, notebooks), a distance compensation element is needed in the smallest of spaces, as well as in any form of built-in display, especially in vehicles, display panels or signs. Here, too, both mechanical distance compensation and heat dissipation are necessary to protect against overheating. In addition, there may also be requirements for electrical and/or magnetic shielding. These can only be inadequately fulfilled by the known distance compensation elements mentioned.

US 2001/007728 A1, US 2016/260946 A1 and US 2016/164061 disclose battery arrays, wherein elements are placed between the individual cells for improved heat transfer.

SUMMARY OF THE INVENTION

Therefore, the present invention is based on the technical object of improving a spacer element and an arrangement of two components and a spacer element.

According to a first teaching, the aforementioned technical problem is solved by a distance compensation element for arrangement between two components with a metal foil and with spring elements integral with the metal foil, wherein the spring elements protrude from the plane of the metal foil and wherein the spring elements are designed to be in contact with at least one of the components, wherein a slit arrangement with a plurality of slits is introduced into the metal foil. The distance compensation element is characterized in that the metal foil is deformed by stretching.

The spring elements protrude to one or both sides of the metal foil and are elastically deformable. The protruding spring elements run at any oblique angle or even perpendicular to the plane of the metal foil. Due to the protrusion of the spring elements, they form an elastic height profile. When installed in a housing, the spring elements are in contact with one of the components or with both components. Depending on the length or thickness of the components, the elastic spring elements can compensate for a dimensional tolerance and at the same time ensure a secure and firm arrangement of the components in the housing.

Due to the metal properties, the metal foil described above thus has good elasticity for distance compensation as well as good thermal conductivity at the same time, so that the distance compensation element described can not only provide good mechanical stability but also good heat dissipation at the same time.

There are various possibilities for forming the spring elements of the metal foil, which are described below.

In a preferred embodiment of the distance compensation element, a slit arrangement with a plurality of slits is introduced into the metal foil so that individual sections are formed which can be selectively formed into the protruding spring elements, while the other areas of the metal foil remain essentially in the original plane of the metal foil. Thus, a functional geometry is formed, which is deformed in a further manufacturing step. The slits can have any shape and in particular be completely or partially straight, curved, bent and/or round or even spiral-shaped.

On the one hand, the slot arrangement can be produced inexpensively and at high process speed by punching. For this purpose, cutting, knives or punches are used for endless metal foils. The use of mechanical tools allows the initial metal foil to be processed quickly, but cracks and sharp edges can occur in the process, which can have a detrimental effect on further use, especially with small dimensions.

On the other hand, the slot arrangement can be produced by etching with greater accuracy, but with greater effort. In etching, for example, UV lithography is used to prepare the etching and then apply the acidic etchant. Etching allows a very precise adjustment of the geometry of the edge area of the slits (chamfers, roundings), so that the deformation of the sections of the metal foil created by the slits can be carried out more accurately. The production is therefore particularly well suited for small dimensions of the distance compensation element.

The previously described slot arrangement can have a regular pattern of slots so that a regular arrangement of spring elements results after deformation. Likewise, it is preferably possible for the slot arrangement to form a pattern with variable length values and/or spacing values. Thus, the arrangement of the spring elements on the metal foil can be arranged, grouped or separated in a targeted manner.

The sections formed by the slot arrangement and intended for forming can be formed by a mechanical application of force. The force can be applied in different ways.

In a first preferred embodiment, the metal foil is deformed in sections by punching. For this purpose, punching dies or punching rollers are used to press the sections out of the plane of the metal foil and to reshape them into the shape of the spring elements. In this case, the spring elements can protrude only on one side of the metal foil for contact with the first component, and the sections of the metal foil that remain substantially in the plane can serve as a contact surface for the second component. Likewise, an embodiment is possible in which the spring elements protrude on both sides of the metal foil and the plane of the non-deformed metal foil is located between the spring elements.

According to the invention, the metal foil is deformed by stretching and forms a so-called expanded metal. When the metal foil is stretched, the sections separated from each other by the slits are pulled apart. At the same time, the material of the foil yields to the forces in such a way that sections arranged transversely to the stretching direction between the slits twist and are deformed out of plane. Thus, the spring elements are formed section by section during stretching. The shape of the spring elements is determined by the structure of the slot arrangement. The protruding sections protrude at an angle, are bent over when in contact with a component and thus form a planar contact with the component.

As an alternative to forming the spring elements starting from a slit arrangement, the metal foil may preferably be formed as a shirred metal foil. The shirred metal foil is produced by folding the initial metal foil at predetermined intervals along parallel lines to create a three-dimensional structure with protruding spring elements.

Another way of manufacturing a distance compensation element is to produce the metal foil by sintering a shaped metal paper. A metal paper is understood to be a paper in which metal particles in the form of metal powder and/or metal fibres are contained in the layer of cellulose fibres and possibly other components. The proportion of metal particles can be, for example, 60% by weight. The metal content allows the paper to be folded and otherwise shaped, with or without a slit arrangement, and thus brought into the shape to be obtained. Subsequently, the metal paper is sintered, whereby, on the one hand, the paper components burn at least partially without residues and, on the other hand, the metal particles fuse with each other but retain the predetermined shape. Thus, a metal foil with protruding spring elements can be produced.

A distance-compensating element made of a metal paper has a porous, three-dimensionally cross-linked metal structure similar to a sponge and contains blowholes and/or pores and, in particular, carbon fibres as residues of the burnt paper components. Such a metal structure does not correspond to a solid film and also does not exhibit a preferred direction caused by a rolling process. The aforementioned properties can be determined with optical microscopy or electron microscopy.

Furthermore, it is possible that the metal foil is provided with spring elements in sections and is designed as a flat metal foil in sections. This allows an asymmetrical arrangement of the spring elements on the one hand and a flat section without spring elements on the other hand for a better heat transfer. Thus, the section of the metal foil with the spring elements can be used for positioning and securing a battery, while the flat section of the metal foil can dissipate the heat to another component such as a housing.

A metal foil described above typically has a thickness in the range of 0.02 to 1.0 mm, in particular up to 2.0 mm. The height of the spring elements projecting from the metal foil is preferably in the range of 0.05 to 5 mm, in particular up to 10 mm, whereby the height can be adapted to the respective application. The spring elements can then bridge tolerances of, for example, up to 3 mm, in particular up to 5 mm, and at the same time ensure a secure arrangement of the components relative to each other even under mechanical stress due to impacts or vibrations.

The metal foil can have a single-layer structure and consists in particular of one of the following metals: copper alloy, in particular a so-called Sol or K alloy, copper-beryllium alloy, copper-zinc alloy, copper-zirconium alloy, copper-tin alloy.

In a preferred embodiment, the metal foil consists of at least two metal layers, wherein at least one metal layer comprises a first metal, wherein at least one metal layer comprises a second metal, wherein the first metal has a greater modulus of elasticity than the second metal, and wherein the second metal has a greater thermal conductivity than the first metal.

Preferably, the metal foil consists of three layers, with the two outer layers consisting of the first metal and the middle layer consisting of the second metal. Bi-metal effects are thus avoided, so that the dimensional stability of the metal foil remains guaranteed even at different operating temperatures. Likewise, a structure consisting of only two metal layers is possible in order to specifically achieve the bi-metal effect for generating mechanical forces in the assembly of the components.

Preferably, the first metal with higher modulus of elasticity is selected from the group: ferritic and austenitic steel or stainless steel, low-carbon forming steel (DD11/1.0332), stainless steel (magnetic), in particular X6Cr17/1.4016, stainless steel (non-magnetic), especially X5CrNi18-10/1.4301, iron-nickel alloys, nickel, especially Ni99.2/2.4066, nickel alloy and titanium, especially Ti Grade 1/3.7025.

In a preferred manner, the second metal with greater thermal conductivity is selected from the group: copper, low-alloyed copper alloys, in particular Cu-ETP (E-Cu)/CW004A, aluminium, in particular Al99.5/EN-AW-1050A, aluminium alloys with magnesium, zinc, copper, manganese, lead and/or silicon contents, bronze alloys, in particular CuSn4/CW450K, silver, gold.

Said first metals have a modulus of elasticity in the order of 90-210 kN/mm$^2$ in particular and said second metals in the order of less than 70-140 kN/mm$^2$.

Said second metals have thermal conductivity in the order of greater than 100 W/(m*K) and up to 400 W/(m*K) and said first metals have thermal conductivity in the order of between 10 and 100 W/(m*K).

Thus, the thermal conductivity of the second metal is 10-1000 times greater than when using plastics, as is common in the state of the art.

In a particularly preferred embodiment of the metal foil, the first metal comprises an aluminium alloy and the second metal comprises a stainless steel.

The metal layers of the metal foil are preferably plated and form a strong bond.

The metal layers of the metal foil have different thicknesses, with the at least one metal layer made of the first metal with a higher modulus of elasticity preferably thinner than the at least one layer made of the second metal with a higher thermal conductivity. This is because the thickness required to produce a resilient property of the spring element is small, while the thickness of the layer of the second metal should be as large as possible for good heat dissipation. In this case, the thickness of the layer of the first metal is preferably 5 to 20% of the total thickness of the metal foil, so that in a two-layer structure, the layer of the second metal preferably accounts for 80 to 95% of the total thickness. In a three-layer structure, the thickness of the middle layer of the second metal has in particular a relative thickness of 60 to 90%.

In the previously described embodiments of the distance compensation element, the metals have been described in terms of their thermal conductivity and modulus of elasticity. The metals are electrically conductive and form a shield against electric fields. Thus, the distance compensation element has the additional properties of electrical shielding, which is particularly advantageous when used with electronic devices.

In a further embodiment of the distance compensation element, the metal foil has a ferromagnetic metal at least in sections, preferably over the entire surface, and in at least one layer. Thus, not only a shielding against electric fields can be achieved by the metal foil, but the metal foil also causes an additional protection of the component against magnetic fields and thus ensures an improvement of the electromagnetic compatibility (EMC) of the component. Examples of ferromagnetic metals are pure iron, carbon steels, tinplate, iron-nickel alloys, cobalt-iron alloys, p-metal, amorphous materials, ferritic alloys, stainless steel, especially X6Cr17/1.4016 or a higher alloyed ferritic steel 1.4568.

The distance compensation element is preferably used with electronic or electrical components. These components are usually electrically insulated per se, but it may be advantageous for an electrically insulating layer to be arranged on at least one side of the metal foil. This layer can be formed as a foil, in particular as a Kapton foil, or by a liquid material application. The insulating layer can be applied over the entire surface or partially for electrical insulation. When applying the insulating layer to the protruding spring elements, it must be taken into account that the spring elements are not or only slightly restricted in their function after the insulating layer has been applied. The insulating coating provides improved electrical insulation to prevent electrical currents and leakage currents as well as improved dielectric strength of the distance compensation element.

Alternatively, the distance compensation element can also be used for electrical contacting of the components with each other, for example of batteries with the same polarity. For this purpose, it is provided that the contact points or contact surfaces of the components rest against the metal foil, in particular against the protruding spring elements. Due to the further properties of the distance compensation element already described, a safe contacting of the components can be ensured.

To improve the contacting and thereby avoid high transition resistances during heat conduction, the distance compensation element can be improved in the area of the machined-out spring elements by means of applied adhesive elements, e.g. heat conducting foil provided with adhesive on both sides, pastes or the like, by means of a specific surface treatment, for example by structuring or punching, or by coating. The listed additional components can be made of metallic or non-metallic, organic or inorganic materials.

According to the invention, the technical problem outlined above is also solved by using a metal foil as a distance-compensating element for arrangement between two components, wherein the metal foil is formed according to one of the examples and variants explained above.

The technical problem is also solved by an arrangement of a first component, a distance compensating element and a second component, wherein the metal foil is formed according to one of the previously explained examples and variants, wherein the distance compensating element is arranged between the two components, and wherein the spring elements of the distance compensating element compensate for dimensional variations of the first component, and wherein the distance compensating element transfers thermal energy from the first component to the second component.

Preferably, if the spring elements protrude only on one side of the plane of the metal foil, the spring elements are in contact with one of the components and the metal foil with the non-deformed sections is in contact with the other component. If the spring elements protrude on both sides of the metal foil, then on both sides of the distance compensation element the spring elements are in contact with the components.

A further preferred embodiment of the arrangement described is that at least two distance compensation elements of the type described above are arranged between the first component and the second component. Thus, the resilient and thermally conductive properties of the at least two distance compensating elements add up.

The generally described arrangement can be used in various applications. The first component may be an electrical component, in particular a battery, a battery cell assembly or a display, and the second component may be a mechanical component, in particular a battery tray, a housing, a dashboard of a vehicle or an aircraft, a display panel or a road sign.

An important application of the distance compensation element is the use in a battery arrangement for a vehicle. As has been explained in the introduction, the rechargeable batteries, preferably round cells, have manufacturing tolerances in the range of, for example, up to 3 mm. The battery cells are arranged next to each other in a battery tray, which is closed with a lid. In the battery tray, the distance compensation element is arranged on the bottom and the battery cells are placed—individually or in groups as a group—on the distance compensation element. When the lid is closed, the upper ends of the batteries or battery groups come into contact with the inside of the lid and are pressed down against the distance compensation element. Since the distance compensation element has the elastically deformable spring elements, the distance compensation element yields in sections depending on the load so that compensation for the different lengths of the batteries is achieved.

The distance compensation element thus first has a mechanical securing function in that the batteries or battery groups are held elastically and resiliently within the battery housing consisting of battery tray and cover. In this way, the batteries are secured against movement within the battery housing caused by shocks or vibrations.

Due to the firm contact with the batteries, the distance compensation element can also absorb heat from the batteries and dissipate this heat through the contact with the battery tray. In addition to the mechanical protection, the distance compensation element also takes over the function of heat dissipation.

As described above, the metal foil of the distance compensation element can have an electrically insulating coating that is in contact with the batteries or battery groups when installed. This prevents electrical energy from being dissipated via the distance compensation element.

Alternatively, the metal foil of the distance compensation element can also be uncoated so that the metal foil connects the electrical contacts of the batteries and is also connected to an electrical line to pass on the electrical energy.

Another area of application of the arrangement described is the mechanical protection and heat relief of electronic devices such as smart phones, tablets, notebooks or other smart devices. The dimensioning is considerably smaller compared to the previously described example of the vehicle battery, so that the spring elements of the metal foil of the distance compensation element are significantly smaller. Nevertheless, the same functionalities as described above can be fulfilled in such electronic devices.

As described above, the metal foil can also be provided with spring elements only in sections and be designed as a flat metal foil in sections. In this way, an asymmetrical arrangement of the spring elements in the area of the battery on the one hand and a flat section without spring elements for better heat transfer outside the area of the battery arranged in the housing can be realised. Thus, the section of the metal foil with the spring elements can be used for positioning and securing a battery, while the flat section of the metal foil can dissipate the heat to the housing.

Another application of the arrangement is the mounting and securing of screens, for example in vehicles or aircraft. Since the area of the screens used is constantly increasing and, in addition, curved screens are also used, it is advantageous to use the described distance compensation elements for screens. This is because the respective screen is inserted into a housing in which a distance compensation element is already arranged. By pressing and latching the screen to the housing, the screen is held securely in position by means of the distance compensation element, whereby manufacturing tolerances or dimensional changes are also compensated here by heating through the spring elements of the metal foil. The dissipation of heat is also advantageous in this application.

It is also preferable that the metal foil consists of a ferromagnetic metal at least in sections. This makes it possible to achieve better electromagnetic compatibility (EMC) of the screen. This EMC is particularly advantageous for large screens, since the increasing electronic control and digitalisation of vehicles means that more electrical signals are transported in the vehicle, which can lead to interference with the control signals of the screen. Thus, in addition to the improved mechanical protection and the increased thermal compensation, the distance compensation element can also achieve the electromagnetic compatibility of screens.

Furthermore, the described distance compensation elements can also be used in display panels and signs to secure screens or lighting devices there or at least their power supply by batteries and to improve their thermal management.

BRIEF DESCRIPTION OF THE DRAWINGS

In the following, the invention is explained by means of embodiment examples with reference to the drawing. The drawing shows FIG. 1 an example of a distance compensation element according to the invention, FIG. 2 the metal foil for producing the distance compensation element according to FIG. 1 with an inserted slot arrangement, FIG. 3 a top view of the distance compensation element shown in FIG. 1, FIG. 4, 4a a side view of the distance compensation element shown in FIG. 1, FIG. 5a, b an example of a distance compensation element according to the invention, FIG. 6a-f Examples of metal foils with different slot arrangements for the production of distance compensation elements, FIG. 7a, b a section of a metal foil with a slot arrangement for producing a distance compensation element, FIG. 8a, b a section of a metal foil with a slot arrangement for producing a distance compensation element, FIG. 9a, b an arrangement according to the invention with a distance compensation element according to FIG. 8, FIG. 10a, b an example of a distance compensation element according to the invention, FIG. 11 an example of a distance compensation element according to the invention and FIG. 12 an arrangement according to the invention.

DESCRIPTION OF THE INVENTION

In the following description of the various embodiments according to the invention, the same components are given the same reference signs, even if the components may differ in dimension or shape in the various embodiments.

FIGS. 1 to 4 show a first embodiment of a distance-compensating element 2 according to the invention for arrangement between two components, the figures depicting different states and views of the metal foil 4.

Figure 1:
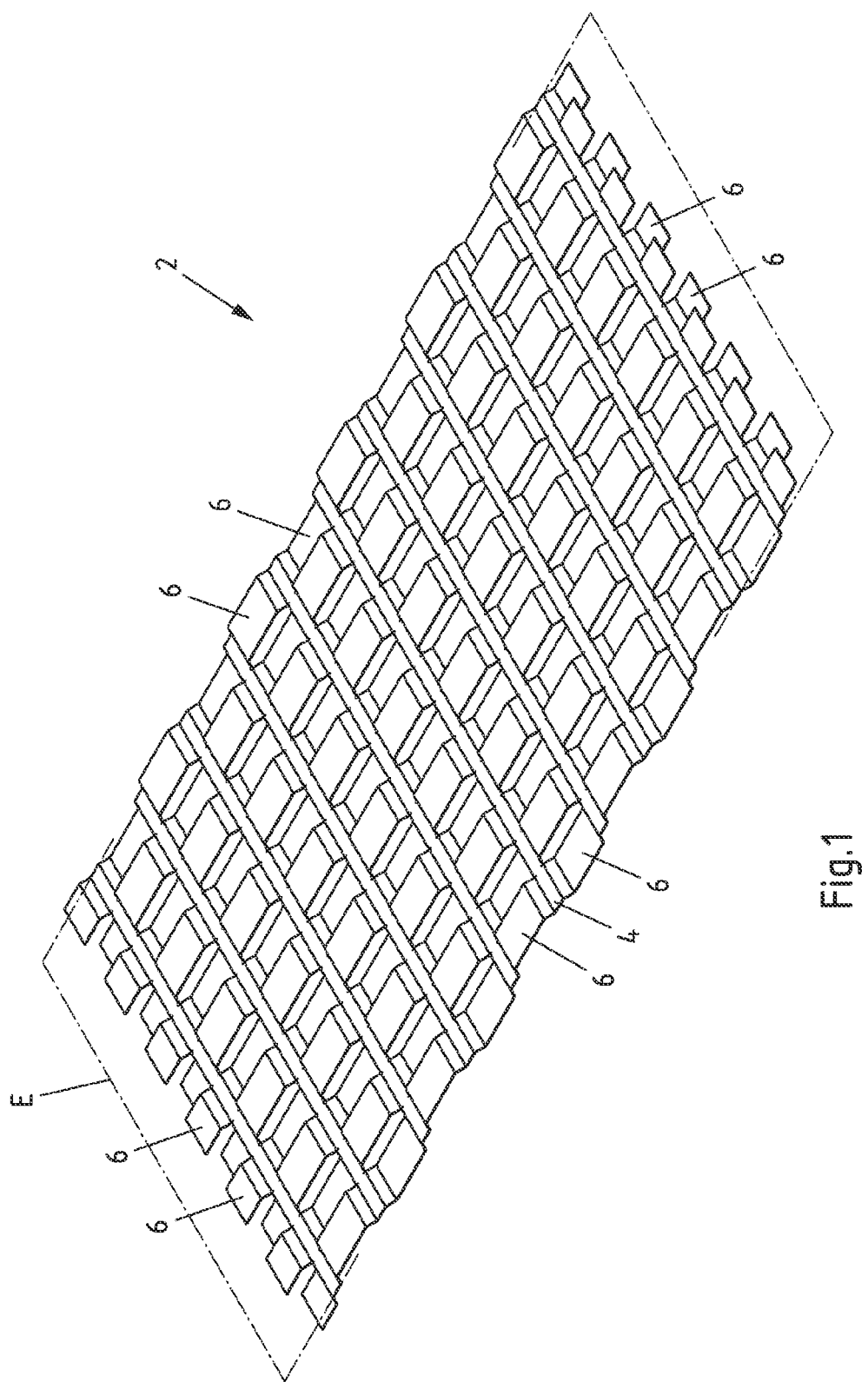
Figure 12:
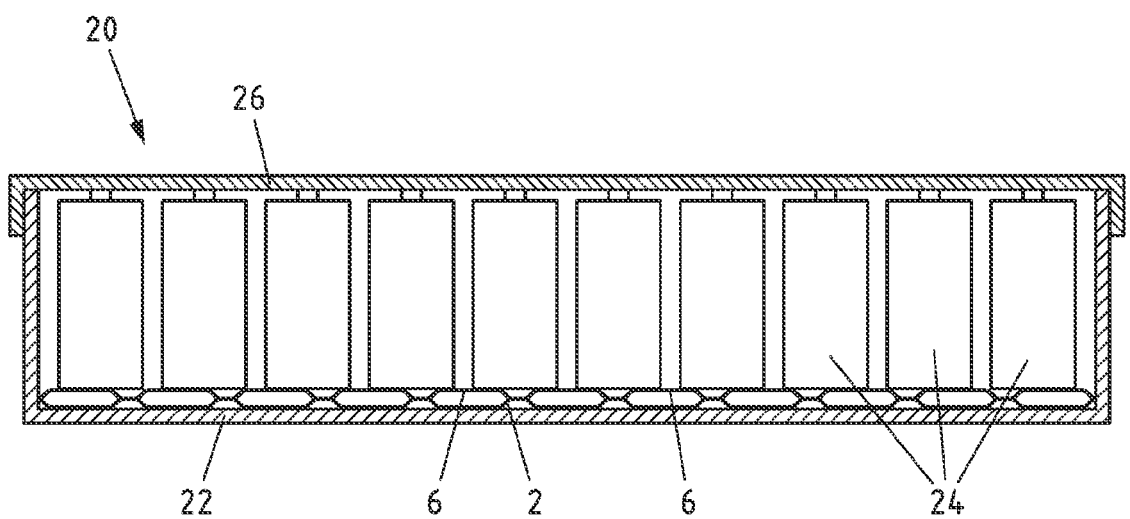

The completed distance compensation element 2 is first shown in FIG. 1 in a perspective view and consists of a metal foil 4 and spring elements 6 integrally formed with the metal foil 4. The spring elements 6 protrude from the plane E of the metal foil 4 and are designed to be in contact with at least one of the components. Such an arrangement is shown in FIG. 12 and will be explained in more detail below.

Figure 2:
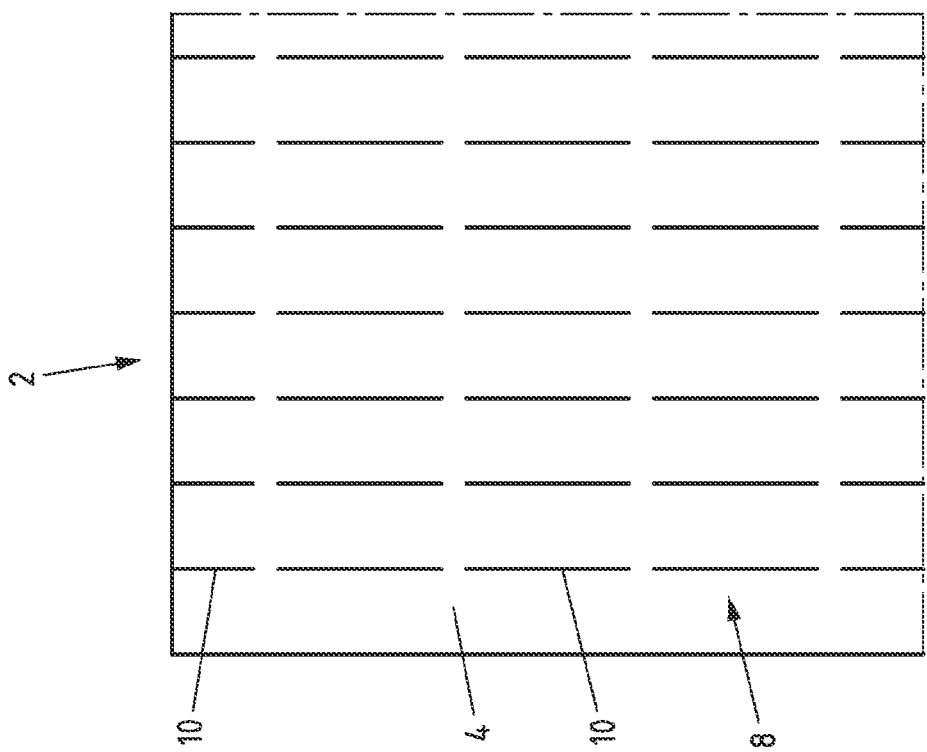

The still unprocessed metal foil 4 is first provided with a slit arrangement 8. FIG. 2 shows a section of the metal foil 4 with the slot arrangement 8 before further processing. The slit arrangement 8 consists of a number of slits 10 inserted parallel to each other, which form a functional geometry. The slits 10 are made in the metal foil 4 with knives, cutting or punching or alternatively by etching.

Figure 3:
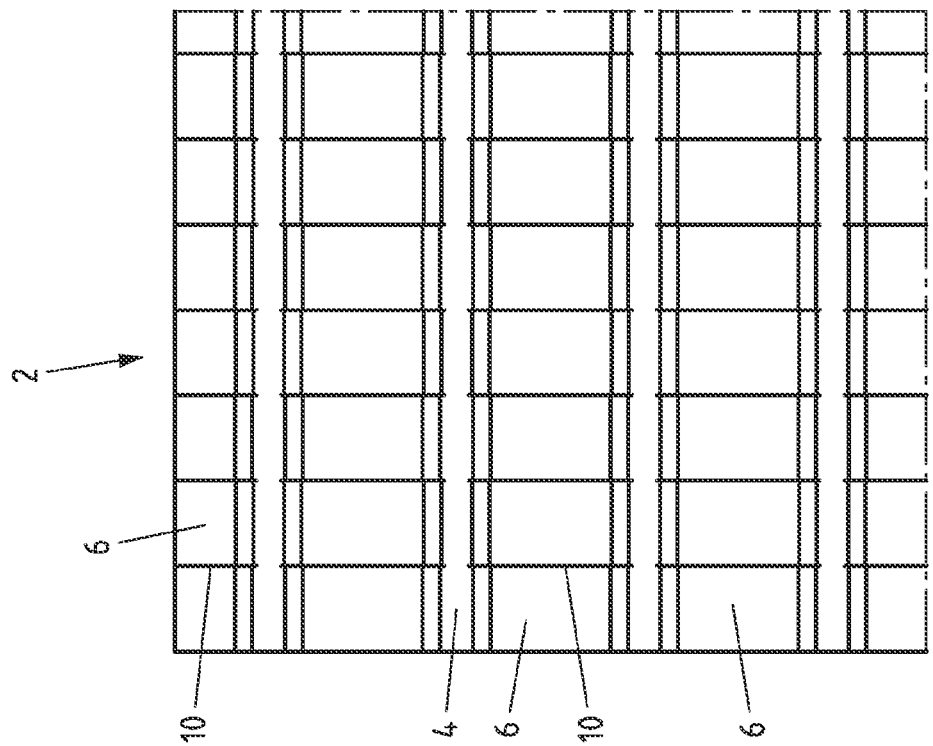

FIG. 3 shows the same section of the metal foil after the metal foil 4 has been formed and FIG. 1 shows the perspective view of the entire metal foil 2. In each case, a section between two slits 10 has been formed, i.e. punched, out of the plane E of the metal foil 4 towards one side, while the adjacent section between the slits 10 has been punched towards the other side. Thus, the formed sections alternate on both sides of the metal foil 4 and form the spring elements 6. The spring elements 6 each have a flat section which, when installed, is in contact with one of the components. The flanks of the protruding spring elements 6 are deep-drawn.

This arrangement of the spring elements 6 is also clear from FIGS. 4 and 4a, which is an enlargement of a section. FIG. 4 shows a cross-section of the metal foil 4, whereby FIG. 4a clearly shows the alternating course of the spring elements 6.

The material selection of the metal foil 4 described above enables a combination of good elasticity and good thermal conductivity at the same time, so that the distance compensation element 2 fulfils two different functionalities in one component.

Figure 5B:
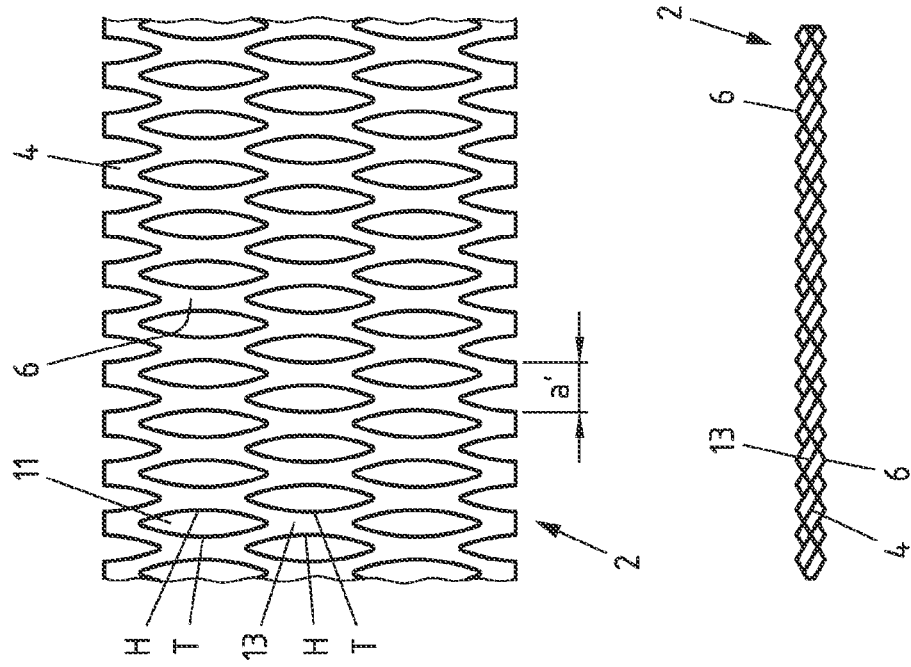
Figure 5A:
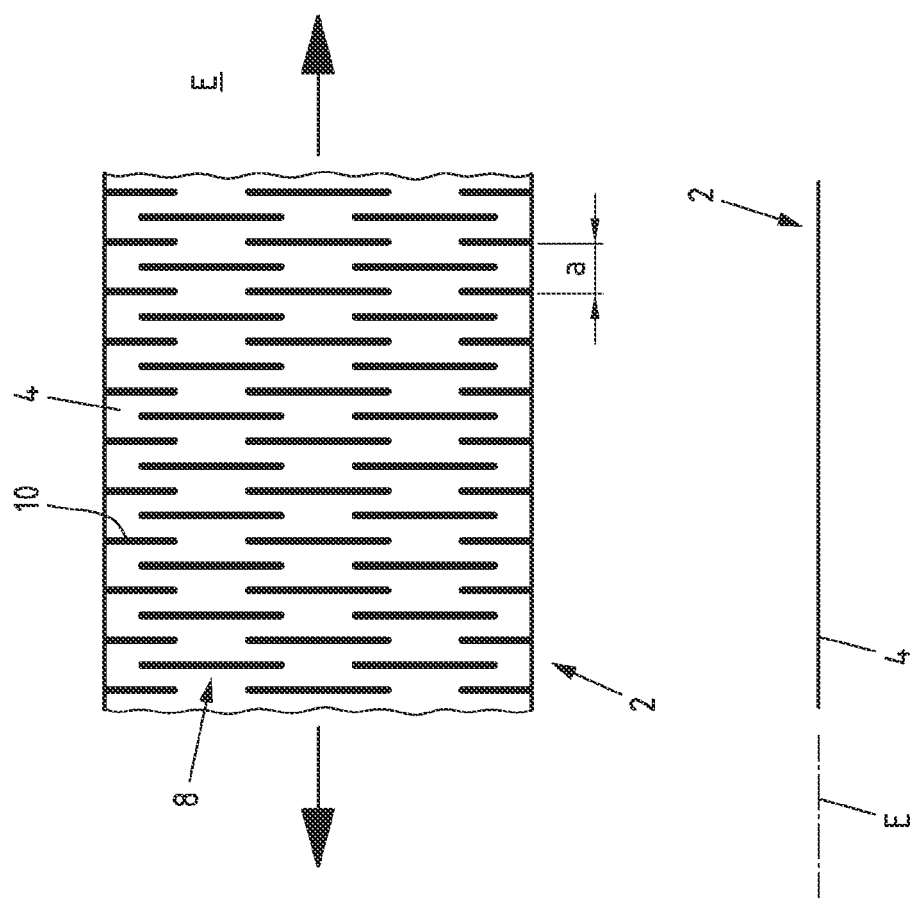
Figure 6C:
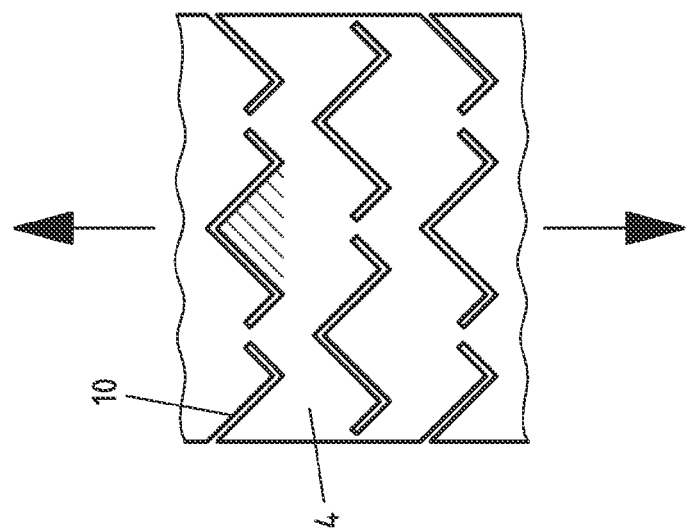
Figure 6B:
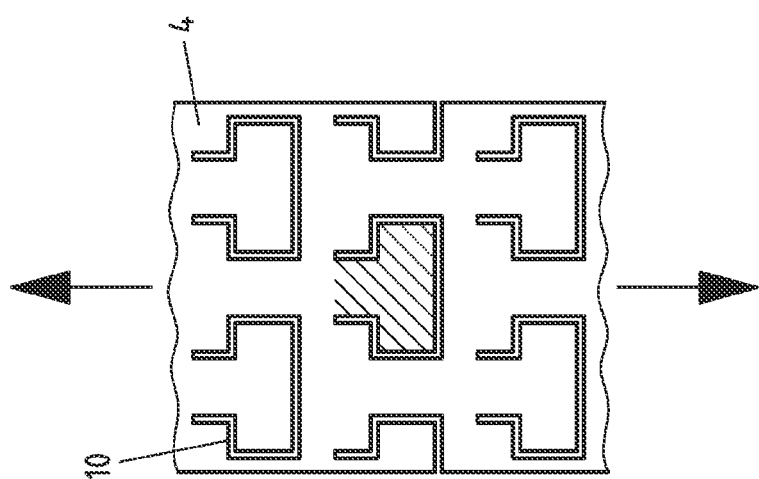
Figure 6A:
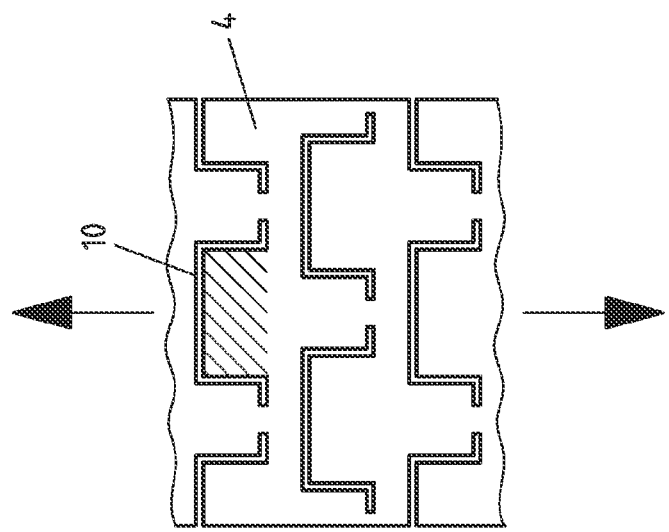
Figure 6D:
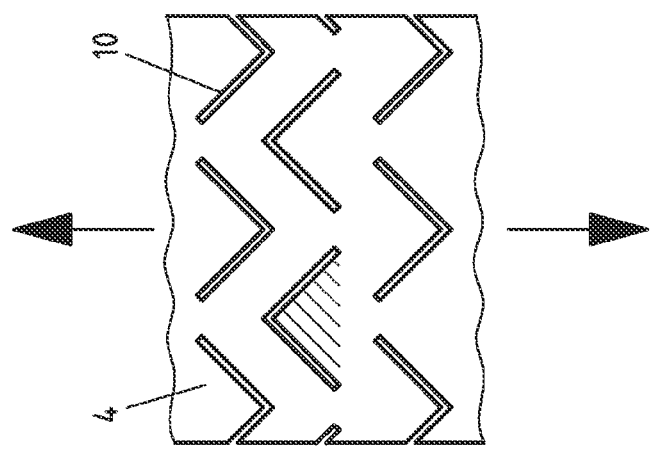
Figure 6E:
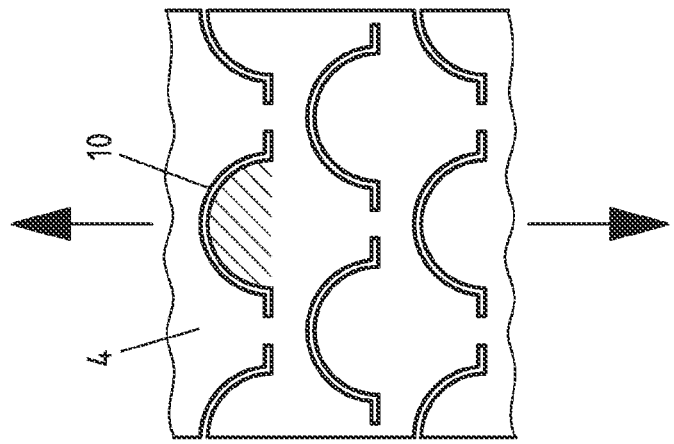
Figure 6F:
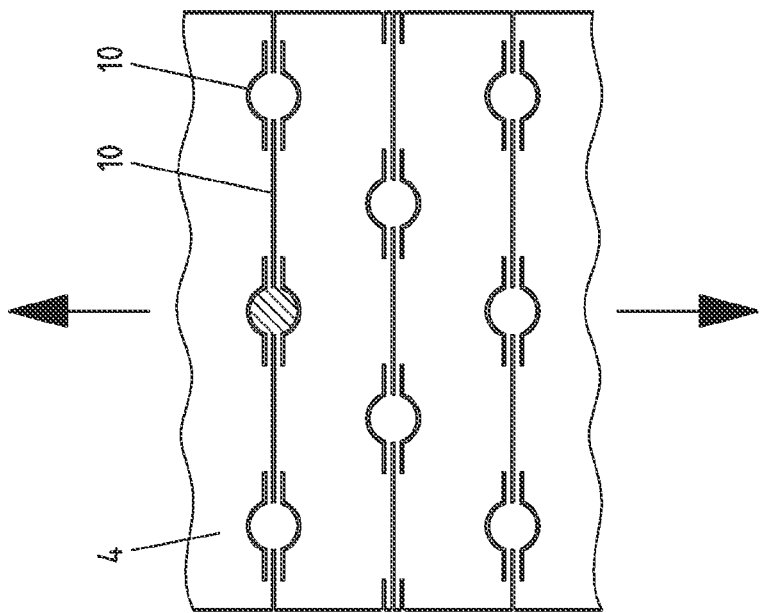

FIG. 5 shows a further embodiment of a distance compensation element 2 according to the invention, which is produced by stretching a metal foil 4. FIG. 5a shows the metal foil 4 in the initial state with inserted slots 10 of a slot arrangement 8 before stretching. The slits 10 have a distance a.

In FIG. 5b the metal foil 4 is shown after stretching, i.e. as expanded metal. By stretching the metal foil 4 in the direction of the two arrows shown on the left, the slits are pulled apart so that they form oval openings 11 with webs 13 arranged between them. On the one hand, this results in a greater length of the stretched metal foil 4, so that the distance a' is greater than the original distance a. On the other hand, the webs 13 are set up transversely to the plane E (drawing plane in the upper section of FIG. 5) of the metal foil 4 as is usual when stretching, whereby the webs 13 are deflected upwards and downwards according to FIG. 5 and form spring elements 6 projecting upwards and downwards.

The bars 13 are shown in FIG. 5b as oblique lines. In the enlarged section, the letters H and T indicate that the corresponding edge of the bars 13 between two oval openings 11 protrude upwards (H—high) or downwards (T—low).

The metal foil 4 has thus been transformed into the distance compensation element by stretching. The protruding spring elements 6 run at an angle to the plane E of the metal foil 4, cause a change in height and thus form the elastic spring elements 6.

FIGS. 6a to 6f show six further designs of metal foils 4 in section, which have slot arrangements 10 with different geometries. In all examples, the direction of pull is vertical and the respective exemplary hatched sections of the metal foil 4 bounded by slits 8 straighten transversely to the plane E (drawing plane of FIG. 6) when the metal foil 4 is stretched and form the spring elements 6.

Figure 7B:
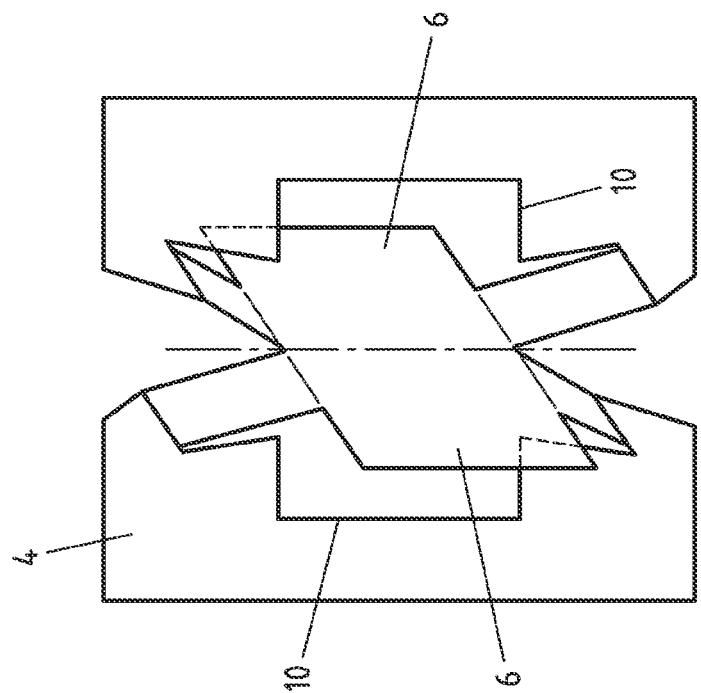
Figure 7A:
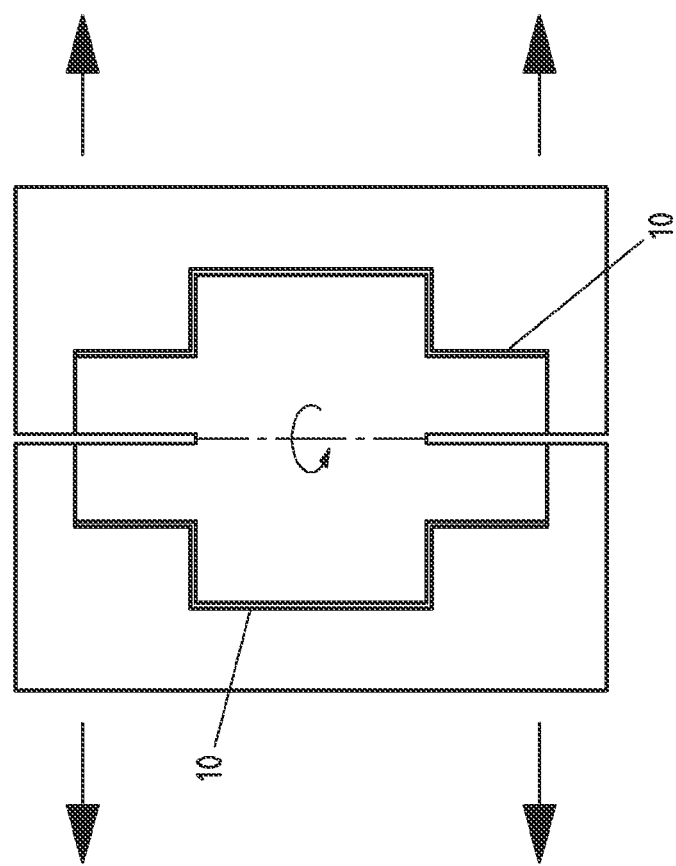

FIGS. 7a and 7b show an example of an embodiment in which the non-stretched metal foil 4 is shown in FIG. 7a. FIG. 7b shows the metal foil 4 after stretching. By stretching in the direction of the arrows shown, the middle section twists and forms protruding spring elements 6 on both sides transverse to the plane E (drawing plane of FIGS. 7a, 7b).

The spring elements 6 explained above with reference to FIGS. 6 and 7 project at an angle transverse to the plane E of the metal foil 4. When the spring elements 6 come into contact with a component and come into contact, the spring elements 6 are partially bent over and thus generate the elastic spring force. In the process, the spring elements 6 come at least partially into surface contact with the component in order to realise the heat transfer.

Figure 8A:
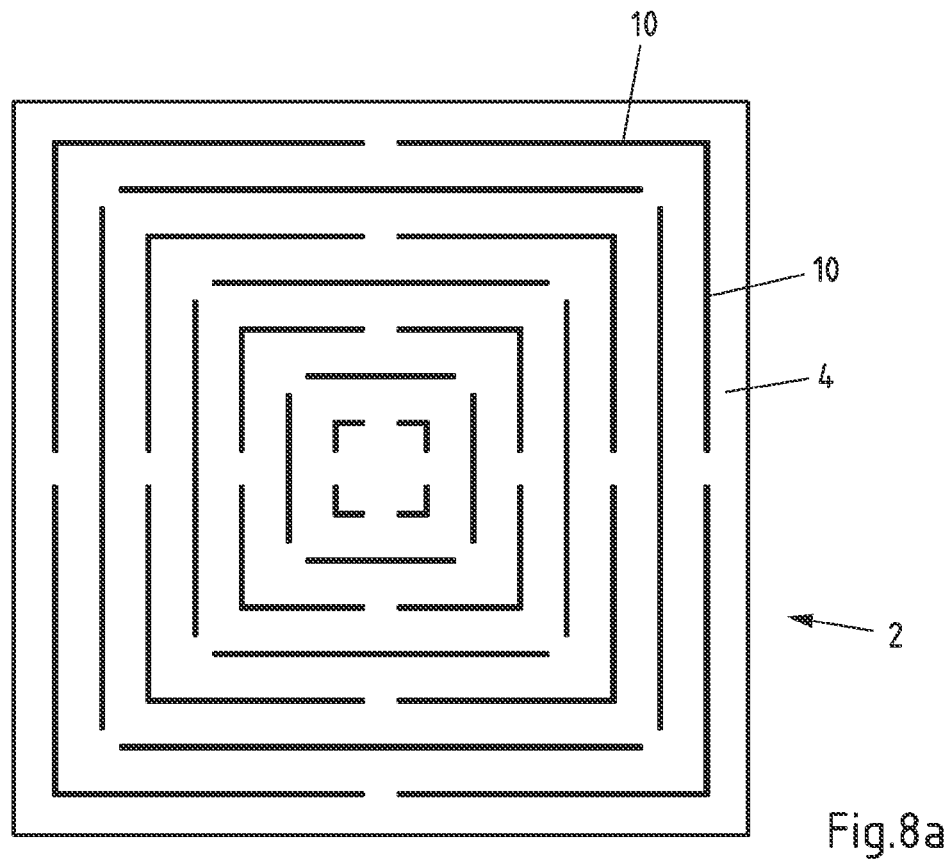

FIG. 8 shows a further design of a distance-compensating element 2 according to the invention. According to FIG. 8a, the metal foil 4 has a slot arrangement 10 in the initial state, which has a rectangular or square ground plan. The square slots 10 arranged one inside the other have interruptions alternately at the corners or centrally along the side edges.

Figure 8B:
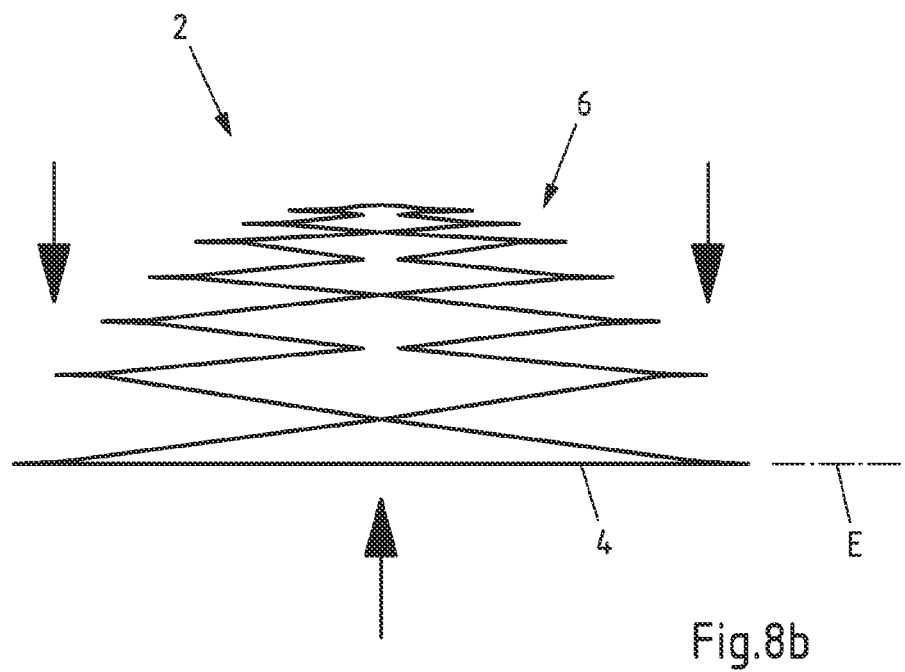

FIG. 8b shows the forming of the metal foil 4, whereby in the outer areas of the slit structure the metal foil is pressed relatively downwards and the middle area is pressed relatively upwards. This creates an accordion-like structure that protrudes from the plane E of the metal foil 4 similar to a pyramid.

In a further embodiment, the distance compensation element 2 may be provided with a plurality of spring elements 2 previously described with reference to FIG. 8.

Figure 9A:
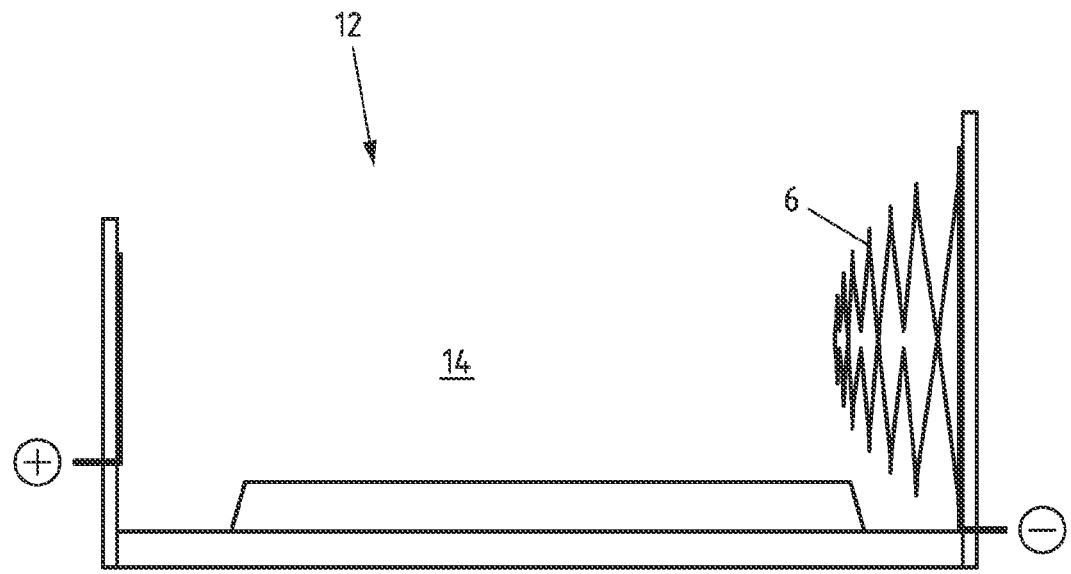
Figure 9B:
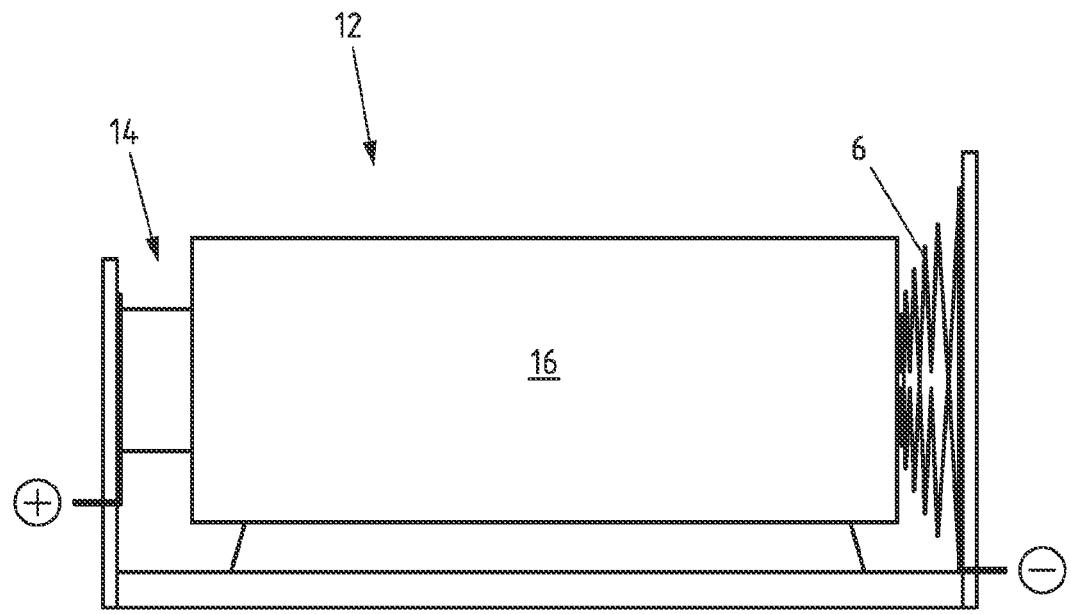

FIG. 9 shows an application example of a distance compensation element 2 according to FIG. 8 in the form of a battery holder 12 with a receptacle 14 for a cylindrical battery 16. The receptacle 14 has the distance compensation element 2 with the projecting spring element 6 on the right edge, in FIG. 9a in the relaxed state. When the battery 16 is inserted as shown in FIG. 9b, the spring element 6 is partially compressed and holds the battery 16 securely in the receptacle 14. At the same time, the distance compensation element 2 ensures both heat dissipation and electrical contact and transmission of the electrical energy through the flat contact of the spring element 6 with the negative pole of the battery 16.

Figure 10A:
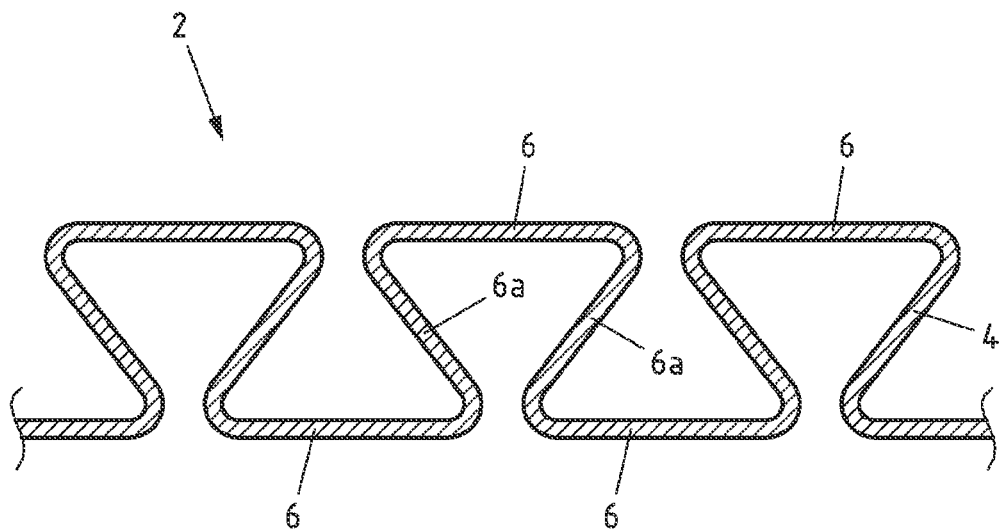
Figure 10B:
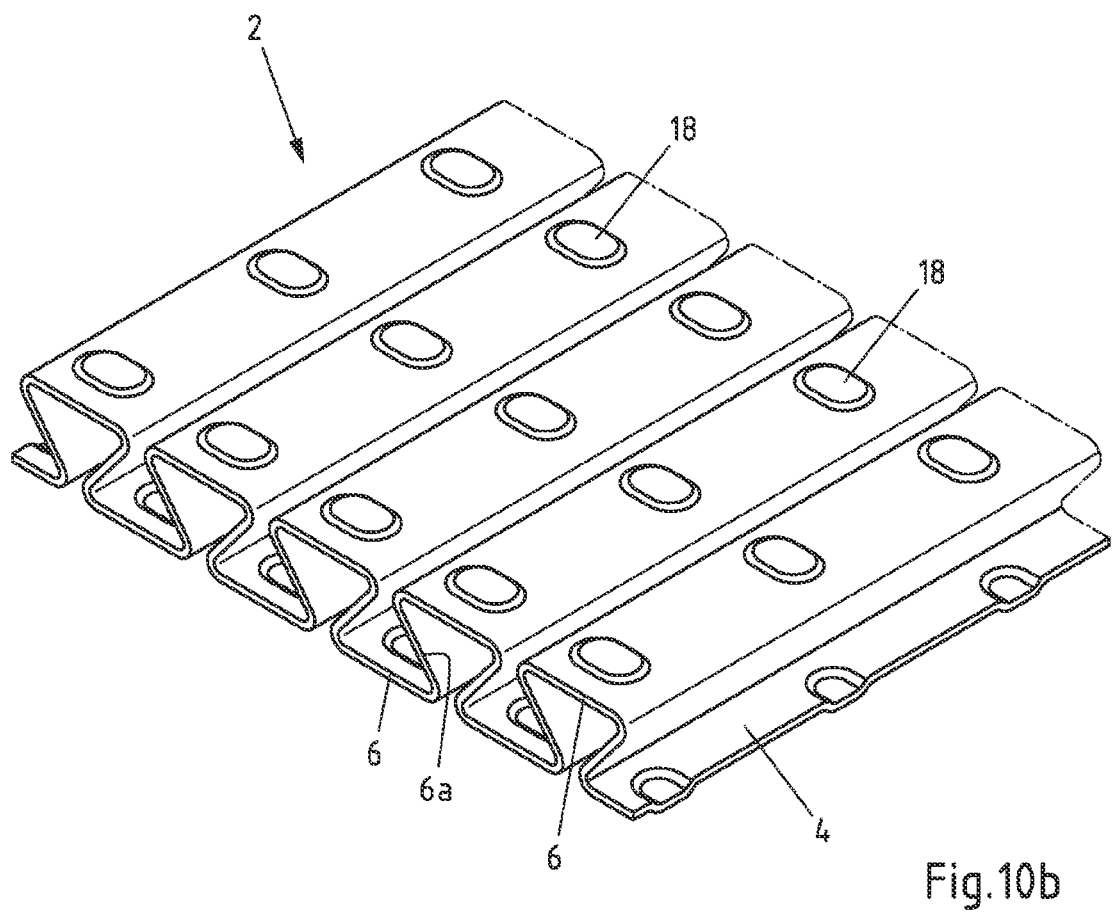
Figure 11:
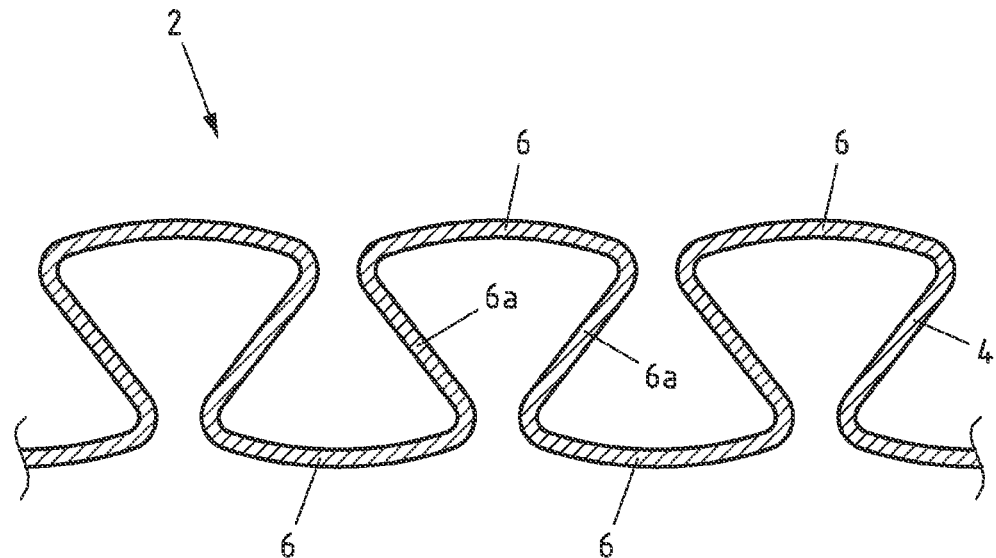

FIGS. 10a, 10b and 11 show two further embodiments of distance compensation elements 2, each consisting of a shirred metal foil 4.

FIG. 10a shows a cross-section through the metal foil 4 and FIG. 10b shows a partially cut three-dimensional representation. In contrast to previous embodiment examples, the metal foil 4 does not have a slit structure, but is produced from a flat starting metal foil by folding and bending along parallel lines and at regularly recurring intervals. This results in a three-dimensional structure with elongated spring elements 6 protruding to both sides. In the cross-section shown in FIG. 10a, it can be seen that each spring element 6 has inner sections 6a running obliquely in cross-section, which give way in the event of vertically acting forces and cause the required elasticity of the spring elements 6.

In FIG. 10b it can also be seen that the spring elements 6 have spaced projecting contact elements 18, which were introduced by punching in the flat spring elements 6 before folding and bending. With the contact elements 18, the spring force of the spring elements 6 is concentrated on a few contact sections.

FIG. 11 shows another embodiment similar to the example in FIG. 10. The distance compensation element 2 in FIG. 10 has a straight course of the projecting surfaces of the spring elements 6 and the inner sections 6a. The distance compensation element according to FIG. 11, on the other hand, shows a slightly curved course of the projecting surfaces of the spring elements 6.

FIG. 12 shows an arrangement 20 according to the invention consisting of a first component in the form of a plurality of rechargeable batteries 22, a distance compensation element according to FIG. 1 and a second component in the form of a battery tray 24. The distance compensation element 2 is arranged between the two components 22 and 24. By closing and, if necessary, latching a cover 26, the batteries 22 are pressed down against the distance compensation element 2 and thus fixed within the battery housing formed by the battery tray 24 and cover 26.

The spring elements 6 of the distance compensation element 2 thus compensate for variations in the dimensions of the batteries 22, as the individual spring elements 6 are deformable independently of each other and can apply different spring forces. In addition, the distance compensation element 2 transfers the heat energy in the batteries during use or during charging from the batteries 22 to the battery tray 24 by resting on both components 22 and 24.

The illustration of the arrangement in FIG. 12 is schematic and does not take into account the electrical connections necessary for such a battery cell arrangement.

The invention claimed is:

1. A distance compensation element for arrangement between two components:
    with a metal foil and
    with spring elements integral with the metal foil,
    wherein the spring elements protrude from a plane of the metal foil,
    wherein the spring elements are designed to be in contact with at least one of the components,
    wherein a slit arrangement with a plurality of slits is introduced into the metal foil, and
    wherein the metal foil is deformed by stretching,
    that the metal foil consists of at least two metal layers,
        that at least one metal layer consists of a first metal,
        that at least one metal layer consists of a second metal,
        in that the first metal has a greater modulus of elasticity than the second metal, and
        that the second metal has a greater thermal conductivity than the first metal.

2. The distance compensation element according to claim 1,
    wherein the metal foil is provided in sections with spring elements and is formed in sections as a plane metal foil.

3. The distance compensating element according to claim 1,
    wherein the first metal is made of an aluminium alloy and the second metal is made of a stainless steel.

4. The distance compensation element according to claim 1,
    wherein the metal foil consists of three layers, two outer layers consisting of the first metal and a middle layer consisting of the second metal.

5. The distance compensating element according to claim 1,
    wherein the metal foil comprises a ferromagnetic metal at least in sections and in at least one layer.

6. The distance compensation element according to claim 1,
    wherein an electrically insulating layer is arranged on at least one side of the metal foil.

7. The arrangement of a first component, a distance compensating element and a second component,
    wherein the distance compensating element is formed according to claim 1,
    wherein the distance compensating element is arranged between the two components,
    wherein the spring elements of the distance compensating element compensate for dimensional variations of the first component, and
    wherein the distance compensating element transfers thermal energy from the first component to the second component.

8. The arrangement according to claim 7,
    wherein when the spring elements protrude only to one side of the plane of the metal foil, the spring elements are in contact with one of the components and the metal foil with a non-deformed portions is in contact with the other component.

9. The arrangement according to claim 7,
    wherein that at least two distance compensating elements according to claim 1 are arranged between the first component and the second component.

10. The arrangement according to claim 7,
    wherein the first component is an electrical component, and
    that the second component is a mechanical component.

11. The arrangement according to claim 10, wherein that the electrical component is a battery, a battery cell arrangement, or a display.

12. The arrangement according to claim 10, wherein that the mechanical component is a battery tray, a housing, a dashboard of a vehicle or an aircraft, a display panel, or a road sign.

13. The arrangement according to claim 7,
    wherein the metal foil connects electrical contacts of batteries and is connected to an electrical line.

* * * * *

UNITED STATES PATENT AND TRADEMARK OFFICE
CERTIFICATE OF CORRECTION

PATENT NO. : 11,967,726 B2
APPLICATION NO. : 17/258199
DATED : April 23, 2024
INVENTOR(S) : Bernd Lehmann et al.

Page 1 of 1

It is certified that error appears in the above-identified patent and that said Letters Patent is hereby corrected as shown below:

On the Title Page

Column 1, Assignee, Line 3, delete "Muelheim" and insert -- Muellheim --

In the Claims

Column 11, Line 24, Claim 3, delete "compensating" and insert -- compensation --

Column 11, Line 33, Claim 5, delete "compensating" and insert -- compensation --

Signed and Sealed this
Twenty-third Day of July, 2024

Katherine Kelly Vidal
*Director of the United States Patent and Trademark Office*